Nov. 11, 1941.     R. F. OLSON ET AL     2,262,538
DRAIN TRAY FOR SKILLETS AND THE LIKE
Filed June 1, 1940

INVENTORS
RICHARD F. OLSON
HARRY WESTBERG
BY
ATTORNEY

Patented Nov. 11, 1941

2,262,538

UNITED STATES PATENT OFFICE 2,262,538

DRAIN TRAY FOR SKILLETS AND THE LIKE

Richard F. Olson, Glendale, and Harry Westberg, Los Angeles, Calif.

Application June 1, 1940, Serial No. 338,350

2 Claims. (Cl. 53—7)

This invention relates to a cooking utensil and particularly pertains to a drain tray for skillets and the like.

In frying foods in an open utensil, such as a skillet, it is often desirable to allow certain articles of food to drain after having been cooked and to at the same time be maintained in a warm condition. This is particularly true when a skillet is used in which to fry eggs and bacon or ham. Under such circumstances the bacon or ham is fried and it is desirable to drain the grease from it while the eggs are frying. It is the principal object of the present invention, therefore, to provide a drain tray adapted to be detachably secured on the marginal wall of a skillet, said tray being designed to support articles in a manner to facilitate the drainage of grease and liquid therefrom and back into a utensil where the articles are being cooked, the tray being so designed as to accommodate these articles and to insure that they will stay warm.

The present invention contemplates the provision of a tray provided with clamping means whereby it may be detachably secured over the lip of the side wall of a utensil and held in an inclined position to support articles of food and permit them to drain into the utensil.

The invention is illustrated by way of example in the accompanying drawing, in which.

Figure 1:
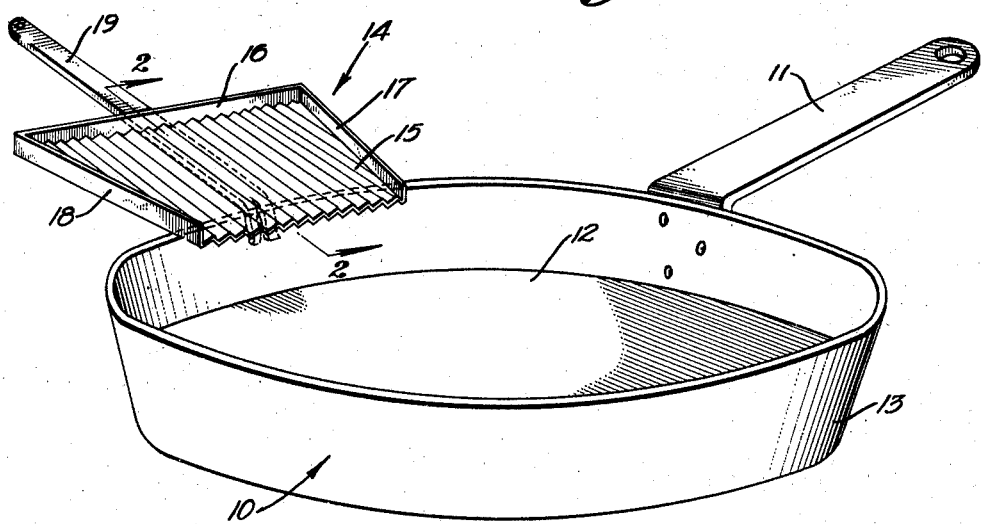
Figure 1 is a view in perspective showing the invention and its application to a skillet.

Referring more particularly to the drawing, 10 indicates a skillet of usual construction provided with a handle 11. The body of the skillet is formed by a bottom 12 circumscribed by a substantially vertical side wall 13. Various articles of food are cooked in skillets, and since the food is usually fried so that it has associated with it a considerable amount of grease it is desirable to drain the grease from it in order that it will be appetizing. This is particularly true for example when frying meat, and especially bacon or ham and eggs. Under such circumstances it is desirable to cook the bacon or ham first and then fry the eggs in the grease from the meat. When this is done it is a problem to keep the meat warm and to at the same time prevent it from standing in the grease which drains from it. In the present invention convenient means are provided to be associated with a skillet and upon which the meat or other cooked articles may be placed in close proximity to the skillet so that they will be maintained desirably hot and so that the grease or other liquid in which they were cooked may freely drain from them and back into the skillet or other utensil. This is accomplished by the use of a drain pan 14 having a corrugated bottom 15 and an upper marginal flange 16 and side marginal flanges 17 and 18. In order that the pan will fit in a desirable manner over the edge of a skillet it is desirable that the sides of the tray shall converge toward the lower edge and thus assume a position somewhat radially inclined to the center of the skillet. The support for the tray 14 comprises a bar 19 which is secured beneath the tray and along the center line thereof. This bar terminates at its outer end in a projecting handle 20 and at its inner end in pronged fingers 21 and 22. These fingers are yieldable and their free ends are formed with curved portions 23 so that they may spread apart and slip astride the wall 13 of the skillet.

Figure 2:
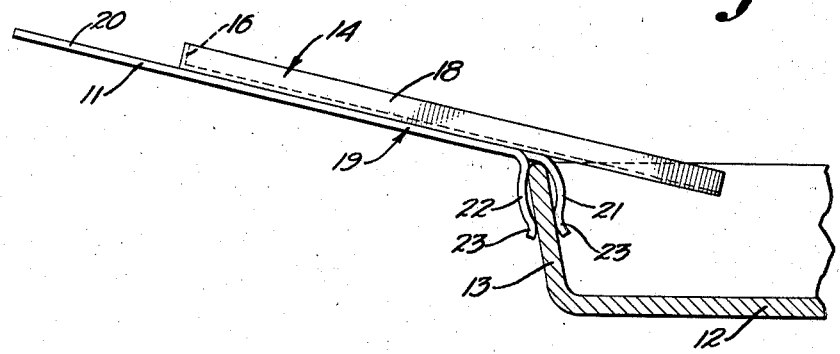
Fig. 2 is an enlarged view in vertical section as seen on the line 2—2 of Fig. 1, showing the detachable means therefor.

Attention is directed to the fact that while the fingers are in their gripping position over the edge of the skillet the body portion of the bar 19 will be disposed at an inclination to the horizontal and will be inclined upwardly and outwardly from the edge of the skillet. This will support the tray in a downwardly inclined position, and as shown in Fig. 2 of the drawing, will dispose the lower lip of the tray to overhang the edge of the skillet.

The corrugations in the tray are parallel to each other as here shown and extend lengthwise of the tray, that is to say they are substantially parallel to the bar 19 so that a plurality of grooves will be formed which lead downwardly and direct grease or other liquids over the lip of the tray and into the skillet. It is to be understood that while the corrugations are shown as being parallel to each other that in the event the tray is formed by the use of a die other types of ridges or grooves may be formed in the bottom 15 of the tray so as to support the food in a manner to permit the grease or other liquids to freely drain therefrom.

In operation of the present invention the structure may be made and assembled as here shown and will thereafter be ready for use. When the structure is used the resilient fingers 21 and 22 may be forced into position over the lip of the wall of the skillet and will be forced to spread to accommodate this member and to grip the same. The tray will then be supported in an inclined position over the lip of the skillet and with its forward lower edge overhanging the lip and extending into the skillet, preferably to a level lower than the upper edge of the skillet wall.

It will thus be seen that by this construction and arrangement the tray will be positioned to support any articles placed upon it and will be held by the ridges in the corrugations so that the intermediate grooves will receive the grease and other liquids draining from the articles and conduct them back into the skillet. At the same time it will be evident that the cooked articles will be held in close proximity to the heated skillet and the fire so that when the remaining articles are cooked they may be served with those upon the tray, all of the articles being in a properly heated and drained condition.

While we have shown the preferred form of our invention as now known to us, it will be understood that various changes may be made in combination, construction and arrangement of parts by those skilled in the art, without departing from the spirit of our invention as claimed.

Having thus described our invention, what we claim and desire to secure by Letters Patent is:

1. In combination with a skillet or a like utensil, an article of manufacture adapted to be detachably mounted upon the side wall of said skillet, said article comprising a handle structure having gripping means at one end thereof to detachably engage the side wall of a utensil and support the handle in upwardly and outwardly inclined position, and an imperforate drain tray secured upon said handle and projecting beyond the end of the handle which carries the gripping means to thereby overhang the edge of the utensil, said tray being formed with a marginal flange along the opposite sides thereof and across the rearmost edge whereby liquid may drain from the floor of the tray along the overhanging edge.

2. In combination with a skillet or a like utensil, an article of manufacture adapted to be detachably mounted upon the side wall of said skillet, said article comprising a handle structure having gripping means at one end thereof to detachably engage the side wall of a utensil and support the handle in upwardly and outwardly inclined position, and an imperforate drain tray secured upon said handle and projecting beyond the end of the handle which carries the gripping means to thereby overhang the edge of the utensil, said tray being formed with a marginal flange along the opposite sides thereof and across the rearmost edge, whereby liquid may drain from the floor of the tray along the overhanging edge, the floor of the tray being formed with longitudinal corrugations extending substantially parallel to the handle whereby articles of food may be supported upon the ridges of the corrugations and the liquid therefrom may drain into the corrugations and longitudinally thereof toward the overhanging edge of the tray.

RICHARD F. OLSON.
HARRY WESTBERG.